United States Patent
Cleary et al.

(10) Patent No.: US 10,035,332 B2
(45) Date of Patent: *Jul. 31, 2018

(54) LIGHT-WEIGHT HYBRID GLASS LAMINATES

(71) Applicant: CORNING INCORPORATED, Corning, NY (US)

(72) Inventors: Thomas Michael Cleary, Elmira, NY (US); Timothy Scott Huten, Big Flats, NY (US); Michael John Moore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,993

(22) Filed: Jul. 12, 2016

(65) Prior Publication Data

US 2016/0318284 A1     Nov. 3, 2016

Related U.S. Application Data

(63) Continuation of application No. 13/937,707, filed on Jul. 9, 2013, which is a continuation-in-part of application No. 13/247,182, filed on Sep. 28, 2011.

(Continued)

(51) Int. Cl.
    *B32B 17/06*     (2006.01)
    *B32B 17/10*     (2006.01)

(52) U.S. Cl.
    CPC .. *B32B 17/10091* (2013.01); *B32B 17/10036* (2013.01); *B32B 17/10119* (2013.01);
(Continued)

(58) Field of Classification Search
    CPC ... B32B 17/10; B32B 17/06; B32B 17/10036; B32B 17/10137; B32B 17/1055;
(Continued)

(56) References Cited

U.S. PATENT DOCUMENTS 3,282,772 A     11/1966   Davis
3,396,075 A     8/1968   Morris
(Continued)

FOREIGN PATENT DOCUMENTS

CN     1623943     6/2005
CN     1993438     7/2007
(Continued)

OTHER PUBLICATIONS

TW101121929 Search Report dated Apr. 29, 2016.
(Continued)

*Primary Examiner* — Joanna Pleszczynska
(74) *Attorney, Agent, or Firm* — F. Brock Riggs

(57) ABSTRACT

A glass laminate comprises an external glass sheet, an internal glass sheet, and a polymer interlayer formed between the external glass sheet and the internal glass sheet. The external glass sheet can be a thin chemically-strengthened glass sheet or can be a non-chemically strengthened glass sheet, the polymer interlayer can have a thickness of less than 1.6 mm, and the internal glass sheet can be a non-chemically-strengthened glass sheet or a thin chemically strengthened glass sheet.

19 Claims, 3 Drawing Sheets

Related U.S. Application Data

(60) Provisional application No. 61/500,766, filed on Jun. 24, 2011.

(52) U.S. Cl.
CPC .. *B32B 17/10137* (2013.01); *B32B 17/10761* (2013.01); *B32B 2605/006* (2013.01); *Y10T 428/24967* (2015.01)

(58) Field of Classification Search
CPC ........ B32B 17/10064; B32B 17/10091; B32B 17/10761; Y10T 428/315; Y10T 428/24967; Y10T 428/2495; B21B 17/10761

See application file for complete search history.

(56) References Cited

U.S. PATENT DOCUMENTS

| | | | |
|---|---|---|---|
| 3,427,770 A | 2/1969 | Kunert et al. | |
| 3,458,388 A | 7/1969 | Moynihan | |
| 3,558,415 A | 1/1971 | Rieser et al. | |
| 3,592,726 A | 7/1971 | Blizard | |
| 3,639,198 A | 2/1972 | Plumat et al. | |
| 3,711,263 A | 1/1973 | Leger | |
| 3,781,184 A | 12/1973 | Domicone et al. | |
| 3,801,423 A | 4/1974 | Van Laethem et al. | |
| 3,900,673 A | 9/1975 | Mattimoe et al. | |
| 4,009,064 A * | 2/1977 | Andrews | B32B 17/10 156/102 |
| 4,124,733 A | 11/1978 | Melling et al. | |
| 4,483,700 A | 11/1984 | Forker, Jr. et al. | |
| 4,595,624 A | 6/1986 | Greathead | |
| 4,643,944 A * | 2/1987 | Agethen | B32B 17/10018 156/106 |
| 4,985,099 A | 1/1991 | Mertens et al. | |
| 5,198,304 A | 3/1993 | Kramling et al. | |
| 5,468,559 A | 11/1995 | Solinov et al. | |
| 5,561,951 A | 10/1996 | Hall | |
| 5,674,790 A | 10/1997 | Araujo | |
| 5,796,055 A | 8/1998 | Benson, Jr. et al. | |
| 5,928,793 A | 7/1999 | Kimura | |
| 6,010,775 A | 1/2000 | Kraemling et al. | |
| 6,156,417 A | 12/2000 | Edwards et al. | |
| 6,361,101 B1 | 3/2002 | Yoshizawa | |
| 6,834,905 B2 | 12/2004 | Okamoto et al. | |
| 7,508,406 B2 | 3/2009 | Oehrlein | |
| 7,666,511 B2 | 2/2010 | Ellison et al. | |
| 7,732,042 B2 | 6/2010 | Fukatani et al. | |
| 7,892,629 B2 | 2/2011 | Rehfeld et al. | |
| 8,986,072 B2 | 3/2015 | Darcangelo et al. | |
| 2002/0150744 A1 | 10/2002 | Nagai | |
| 2008/0318028 A1 | 12/2008 | Winstanley et al. | |
| 2009/0092841 A1 | 4/2009 | Okamoto et al. | |
| 2010/0035038 A1 | 2/2010 | Barefoot et al. | |
| 2010/0151210 A1 | 6/2010 | Shimatani | |
| 2010/0209648 A1 | 8/2010 | Shimatani et al. | |
| 2010/0214194 A1 | 8/2010 | Kanou | |
| 2012/0025559 A1 | 2/2012 | Offermann et al. | |
| 2012/0052275 A1 | 3/2012 | Hashimoto | |
| 2012/0094084 A1 | 4/2012 | Fisher et al. | |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0295357 A1 | 11/2013 | Cleary et al. | |
| 2013/0319046 A1 | 12/2013 | Cleary | |
| 2013/0323415 A1 | 12/2013 | Brackley et al. | |
| 2014/0141217 A1 | 1/2014 | Tsai et al. | |
| 2014/0087159 A1 | 3/2014 | Cleary et al. | |
| 2014/0087193 A1 | 3/2014 | Cites et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Fredholm et al. | |

FOREIGN PATENT DOCUMENTS

| | | |
|---|---|---|
| CN | 101100358 | 1/2008 |
| CN | 101384428 | 3/2009 |
| CN | 101500956 | 8/2009 |
| DE | 102004022008 | 12/2004 |
| EP | 0221287 | 5/1987 |
| EP | 0586296 | 3/1994 |
| EP | 687554 | 12/1995 |
| EP | 1151855 | 11/2001 |
| FR | 2901174 | 11/2007 |
| GB | 1221285 | 2/1971 |
| GB | 1339980 | 12/1973 |
| GB | 2011316 | 7/1979 |
| IT | 32990 | 3/1973 |
| JP | H11-060294 | 3/1999 |
| JP | 2010176621 | 8/2010 |
| JP | 2011136895 | 7/2011 |
| JP | 2011136895 A | 7/2011 |
| JP | 2016008161 A | 1/2016 |
| TW | I296720 | 5/2008 |
| WO | 20000048832 | 8/2000 |
| WO | 200207967 | 1/2002 |
| WO | 2002007967 | 1/2002 |
| WO | 03038501 | 8/2003 |
| WO | 2003068501 | 8/2003 |
| WO | 2015031148 | 3/2015 |
| WO | 2015031151 | 3/2015 |
| WO | 2015031594 | 3/2015 |
| WO | 2015054112 | 4/2015 |

OTHER PUBLICATIONS

Office Action in Japanese Application No. 2014-517011, dated Jun. 23, 2015 (5 page).
Machine Translation of JP2011-136895, dated Jul. 14, 2011 (28 pages).
International Search Report and Written Opinion, dated Sep. 26, 2014, International Application No. PCT/US2014/045554, International Filing date Jul. 7, 2014.
Trosien, et al., "Safety Performance of a Chemically Strengthened Windshield", Society of Automotive Engineers, Inc., Mid-Year Meeting, Chicago, IL, May 19-23, 1969, 690485, pp. 1-22.
Bergman, P.C., Weight, P., and Patrick, L.M., "Safety Performance of Asymmetric Windshields", SAE paper 780900, 1978, pp. 535-564.
International Preliminary Report on Patentability; PCT/US2012/041811; dated Jan. 9, 2014.
International Search Report and Written Opinion of the International Searching Authority; PCT/US2012/041811; dated Aug. 10, 2012.
Safety Performance of Asymmetric Windshields, Begeman, P., King, A., Weigt, P., and Patrick, L., SAE Technical Paper, 1978.
CN201280030862.8 Office Action dated Apr. 20, 2015.
CN201280030862.8 Office Action dated Oct. 10, 2014.
Dharani et al; "Breakage Predicition of Laminated Glass Using the 'Sacrificial Ply' Design Concept"; Journal of Architectural Engineering, Dec. 2004, vol. 10, No. 4, pp. 126-135.
Wang et al.; "Design and adjustment for glass composition"; Chemical Industry Press; P.24-26 Jan. 31, 2006.
Wang, "Design and adjustment of glass components" Chemical Industry Press, pp. 207-222, Dec. 31, 2006 (No Translation Available).

(56) References Cited

OTHER PUBLICATIONS

English Translation of CN201480039262.7 Decision on Rejection, dated Mar. 1, 2018, China Patent Office, 9 Pgs.
English Translation of KR20147001946 Office Action dated Apr. 27, 2018; 3 Pages; Korean Patent Office.

* cited by examiner

LIGHT-WEIGHT HYBRID GLASS LAMINATES

CROSS-REFERENCE TO RELATED APPLICATION

The present application is a continuation and claims the benefit of priority under 35 U.S.C. § 120 of U.S. patent application Ser. No. 13/937,707 filed Jul. 9, 2013, which is a continuation-in-part application of and claims the benefit of priority under 35 U.S.C. § 120 of U.S. patent application Ser. No. 13/247,182, filed on Sep. 28, 2011, which in turn, claims the benefit of priority under 35 U.S.C. § 119 of U.S. Provisional Application Ser. No. 61/500,766 filed on Jun. 24, 2011, the content of each being relied upon and incorporated herein by reference in their entirety.

BACKGROUND

The present disclosure relates generally to glass laminates, and more particularly to hybrid glass laminates comprising a chemically-strengthened outer glass pane and a non-chemically-strengthened inner glass pane. Such hybrid laminates may be characterized by low weight, good sound-damping performance, and high impact resistance. In particular, the disclosed hybrid laminates satisfy commercially-applicable impact test criteria for non-windscreen applications.

Glass laminates can be used as windows and glazings in architectural and transportation applications, including automobiles, rolling stock and airplanes. As used herein, a glazing is a transparent or semi-transparent part of a wall or other structure. Common types of glazings that are used in architectural and automotive applications include clear and tinted glass, including laminated glass. Laminated glazings comprising opposing glass sheets separated by a plasticized poly(vinyl butyral) (PVB) sheet, for example, can be used as windows, windshields, or sunroofs. In certain applications, glass laminates having high mechanical strength and sound-attenuating properties are desirable in order to provide a safe barrier while reducing sound transmission from external sources.

In many vehicular applications, fuel economy is a function of vehicle weight. It is desirable, therefore, to reduce the weight of glazings for such applications without compromising strength and sound-attenuating properties. In this regard, it can be advantageous for a glass laminate to be mechanically robust with respect to external impact events such as attempted forced entry or contact with stones or hail, yet suitably dissipate energy (and fracture) as a result of internal impact events such as contact with an occupant, for example, during a collision. Further, governmental regulations are demanding higher fuel mileage and lower carbon dioxide emissions for road vehicles. Thus, there has been an increased effort to reduce the weight of these vehicles while maintaining current governmental and industry safety standards. Non-glass window materials, such as polycarbonate, have been developed, which reduce vehicle weight but do not offer appropriate resistance to environmental, debris, and other concerns. Embodiments of the present disclosure, however, provide substantial weight reduction, safety compliance, effective durability and reduced laceration potential in the event of a vehicular crash. In view of the foregoing, thin, light weight glazings that possess the durability and sound-damping properties associated with thicker, heavier glazings are desirable.

SUMMARY

According to one aspect of the disclosure, a glass laminate comprises an external glass sheet, an internal glass sheet, and a polymer interlayer formed between the external and internal glass sheets. In order to optimize the impact behavior of the glass laminate, the external glass sheet comprises chemically-strengthened glass and can have a thickness of less than or equal to 1 mm, while the internal glass sheet comprises non-chemically-strengthened glass and can have a thickness of less than or equal to 2.5 mm. In embodiments, the polymer interlayer (e.g., poly(vinyl butyral) or PVB) can have a thickness of less than or equal to 1.6 mm. The disclosed hybrid glass laminate architecture can advantageously distribute stresses in response to impact. For example, the disclosed glass laminates can provide superior impact resistance and resist breakage in response to external impact events, yet appropriately dissipate energy and appropriately fracture in response to internal impact events.

One non-limiting embodiment of the present disclosure provides a glass laminate structure having a non-chemically strengthened external glass sheet, a chemically strengthened internal glass sheet, and at least one polymer interlayer intermediate the external and internal glass sheets, where the internal glass sheet has a thickness ranging from about 0.5 mm to about 1.5 mm and where the external glass sheet has a thickness ranging from about 1.5 mm to about 3.0 mm.

Another non-limiting embodiment of the present disclosure provides a glass laminate structure having a non-chemically strengthened external glass sheet, a chemically strengthened internal glass sheet, and at least one polymer interlayer intermediate the external and internal glass sheets, where the inner glass layer has a surface compressive stress between about 250 MPa and about 900 MPa.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

Figure 1:
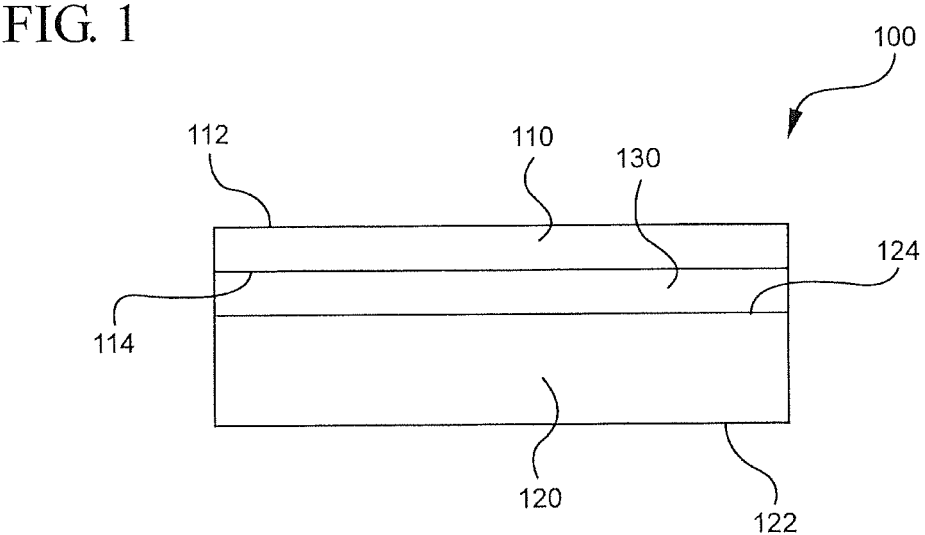
FIG. 1 is a schematic of an exemplary planar hybrid glass laminate according to some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the following description of exemplary or illustrative embodiments is provided for the purpose of illustrating the principles of the present disclosure and not in limitation thereof and may include modification thereto and permutations thereof.

The glass laminates disclosed herein are configured to include an external chemically-strengthened glass sheet and an internal non-chemically-strengthened glass sheet. As defined herein, when the glass laminates are put into use, an external glass sheet will be proximate to or in contact the environment, while an internal glass sheet will be proximate to or in contact with the interior (e.g., cabin) of the structure or vehicle (e.g., automobile) incorporating the glass laminate.

An exemplary glass laminate is illustrated in FIG. 1. The glass laminate 100 comprises an external glass sheet 110, an internal glass sheet 120, and a polymer interlayer 130. The polymer interlayer can be in direct physical contact (e.g., laminated to) each of the respective external and internal glass sheets. The external glass sheet 110 has an exterior surface 112 and an interior surface 114. In a similar vein, the internal glass sheet 120 has an exterior surface 122 and an interior surface 124. As shown in the illustrated embodiment, the interior surface 114 of external glass sheet 110 and the interior surface 124 of internal glass sheet 120 are each in contact with polymer interlayer 130.

During use, it is desirable that the glass laminates resist fracture in response to external impact events. In response to internal impact events, however, such as the glass laminates being struck by a vehicle's occupant, it is desirable that the glass laminate retain the occupant in the vehicle yet dissipate energy upon impact in order to minimize injury. The ECE R43 headform test, which simulates impact events occurring from inside a vehicle, is a regulatory test that requires that laminated glazings fracture in response to specified internal impact.

Without wishing to be bound by theory, when one pane of a glass sheet/polymer interlayer/glass sheet laminate is impacted, the opposite surface of the impacted sheet, as well as the exterior surface of the opposing sheet are placed into tension. Calculated stress distributions for a glass sheet/polymer interlayer/glass sheet laminate under biaxial loading reveal that the magnitude of tensile stress in the opposite surface of the impacted sheet may be comparable to (or even slightly greater than) the magnitude of the tensile stress experienced at the exterior surface of the opposing sheet for low loading rates. However, for high loading rates, which are characteristic of impacts typically experienced in automobiles, the magnitude of the tensile stress at the exterior surface of the opposing sheet may be much greater than the tensile stress at the opposite surface of the impacted sheet. As disclosed herein, by configuring the hybrid glass laminates to have a chemically-strengthened external glass sheet and a non-chemically-strengthened internal glass sheet, the impact resistance for both external and internal impact events can be optimized.

Suitable internal glass sheets are non-chemically-strengthened glass sheets such as soda-lime glass. Optionally, the internal glass sheets may be heat strengthened. In embodiments where soda-lime glass is used as the non-chemically-strengthened glass sheet, conventional decorating materials and methods (e.g., glass fit enamels and screen printing) can be used, which can simplify the glass laminate manufacturing process. Tinted soda-lime glass sheets can be incorporated into a hybrid glass laminate in order to achieve desired transmission and/or attenuation across the electromagnetic spectrum.

Suitable external glass sheets may be chemically strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass to balance the compressive stress.

Exemplary ion-exchangeable glasses that are suitable for forming hybrid glass laminates are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming hybrid glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O)$ 20 mol. % and 0 mol. % $\leq (MgO+CaO) \leq 10$ mol. %.

A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $5b_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\Sigma \text{ modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\Sigma \text{ modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

The chemically-strengthened as well as the non-chemically-strengthened glass, in some embodiments, is batched with 0-2 mol. % of at least one fining agent selected from a group that includes $Na_2SO_4$, NaCl, NaF, NaBr, $K_2SO_4$, KCl, KF, KBr, and $SnO_2$.

In one exemplary embodiment, sodium ions in the chemically-strengthened glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, hybrid glass laminates comprising ion-exchanged glass possess an array of desired properties, including low weight, high impact resistance, and improved sound attenuation.

In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 µm (e.g., at least about 20, 25, 30, 35, 40, 45, or 50 µm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate.

Exemplary glass sheet forming methods include fusion draw and slot draw processes, which are each examples of a down-draw process, as well as float processes. These methods can be used to form both chemically-strengthened and non-chemically-strengthened glass sheets. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Glass sheets can be used to form glass laminates. As defined herein, a hybrid glass laminate comprises an externally-facing chemically-strengthened glass sheet, an internally-facing non-chemically-strengthened glass sheet, and a polymer interlayer formed between the glass sheets. The polymer interlayer can comprise a monolithic polymer sheet, a multilayer polymer sheet, or a composite polymer sheet. The polymer interlayer can be, for example, a plasticized poly(vinyl butyral) sheet.

Glass laminates can be adapted to provide an optically transparent barrier in architectural and automotive openings, e.g., automotive glazings. Glass laminates can be formed using a variety of processes. The assembly, in an exemplary embodiment, involves laying down a first sheet of glass, overlaying a polymer interlayer such as a PVB sheet, laying down a second sheet of glass, and then trimming the excess PVB to the edges of the glass sheets. A tacking step can include expelling most of the air from the interfaces and partially bonding the PVB to the glass sheets. The finishing step, typically carried out at elevated temperature and pressure, completes the mating of each of the glass sheets to the polymer interlayer. In the foregoing embodiment, the first sheet can be a chemically-strengthened glass sheet and the second sheet can be a non-chemically-strengthened glass sheet or vice versa.

A thermoplastic material such as PVB may be applied as a preformed polymer interlayer. The thermoplastic layer can, in certain embodiments, have a thickness of at least 0.125 mm (e.g., 0.125, 0.25, 0.38, 0.5, 0.7, 0.76, 0.81, 1, 1.14, 1.19 or 1.2 mm). The thermoplastic layer can have a thickness of less than or equal to 1.6 mm (e.g., from 0.4 to 1.2 mm, such as about 0.4, 0.5, 0.6, 0.7, 0.8, 0.9, 1.0, 1.1 or 1.2 mm). The thermoplastic layer can cover most or, preferably, substantially all of the two opposed major faces of the glass. It may also cover the edge faces of the glass. The glass sheets in contact with the thermoplastic layer may be heated above the softening point of the thermoplastic, such as, for example, at least 5° C. or 10° C. above the softening point, to promote bonding of the thermoplastic material to the respective glass sheets. The heating can be performed with the glass in contact with the thermoplastic layers under pressure.

Select commercially available polymer interlayer materials are summarized in Table 1, which provides also the glass transition temperature and modulus for each product sample. Glass transition temperature and modulus data were determined from technical data sheets available from the vendor or using a DSC 200 Differential Scanning Calorimeter (Seiko Instruments Corp., Japan) or by ASTM D638 method for the glass transition and modulus data, respectively. A further description of the acrylic/silicone resin materials used in the ISD resin is disclosed in U.S. Pat. No. 5,624,763, and a description of the acoustic modified PVB resin is disclosed in Japanese Patent No. 05138840, the entire contents of which are hereby incorporated by reference in their entirety.

TABLE 1

Exemplary Polymer Interlayer Materials

| Interlayer Material | $T_g$(° C.) | Modulus, psi (MPa) |
|---|---|---|
| EVA (STR Corp., Enfield, CT) | −20 | 750-900 (5.2-6.2) |
| EMA (Exxon Chemical Co., Baytown, TX) | −55 | <4,500 (27.6) |
| EMAC (Chevron Corp., Orange, TX) | −57 | <5,000 (34.5) |
| PVC plasticized (Geon Company, Avon Lake, OH) | −45 | <1500 (10.3) |
| PVB plasticized (Solutia, St. Louis, MO) | 0 | <5000 (34.5) |
| Polyethylene, Metallocene-catalyzed (Exxon Chemical Co., Baytown, TX) | −60 | <11,000 (75.9) |
| Polyurethane Hard (97 Shore A) | 31 | 400 |
| Polyurethane Semi-rigid (78 Shore A) | −49 | 54 |
| ISD resin (3M Corp., Minneapolis, MN) | −20 | |
| Acoustic modified PVB (Sekisui KKK, Osaka, Japan) | | 140 |
| Uvekol A (liquid curable resins) (Cytec, Woodland Park, NJ) | | |

One or more polymer interlayers may be incorporated into a hybrid glass laminate. A plurality of interlayers may provide complimentary or distinct functionality, including adhesion promotion, acoustic control, UV transmission control, tinting, coloration and/or IR transmission control.

A modulus of elasticity of the polymer interlayer can range from about 1 MPa to 75 MPa (e.g., about 1, 2, 5, 10, 15, 20, 25, 50 or 75 MPa). At a loading rate of 1 Hz, a modulus of elasticity of a standard PVB interlayer can be about 15 MPa, and a modulus of elasticity of an acoustic grade PVB interlayer can be about 2 MPa.

During the lamination process, the interlayer is typically heated to a temperature effective to soften the interlayer, which promotes a conformal mating of the interlayer to respective surfaces of the glass sheets. For PVB, a lamination temperature can be about 140° C. Mobile polymer chains within the interlayer material develop bonds with the glass surfaces, which promote adhesion. Elevated temperatures also accelerate the diffusion of residual air and/or moisture from the glass-polymer interface.

The application of pressure both promotes flow of the interlayer material, and suppresses bubble formation that otherwise could be induced by the combined vapor pressure of water and air trapped at the interfaces. To suppress bubble formation, heat and pressure are simultaneously applied to the assembly in an autoclave.

Hybrid glass laminates can provide beneficial effects, including the attenuation of acoustic noise, reduction of UV and/or IR light transmission, and/or enhancement of the aesthetic appeal of a window opening. The individual glass sheets comprising the disclosed glass laminates, as well as the formed laminates, can be characterized by one or more attributes, including composition, density, thickness, surface metrology, as well as various properties including optical, sound-attenuation, and mechanical properties such as impact resistance. Various aspects of the disclosed hybrid glass laminates are described herein.

The hybrid glass laminates can be adapted for use, for example, as windows or glazings, and configured to any suitable size and dimension. In embodiments, the glass laminates have a length and width that independently vary from 10 cm to 1 m or more (e.g., 0.1, 0.2, 0.5, 1, 2, or 5 m). Independently, the glass laminates can have an area of greater than 0.1 m$^2$, e.g., greater than 0.1, 0.2, 0.5, 1, 2, 5, 10, or 25 m$^2$.

The glass laminates can be substantially flat or shaped for certain applications. For instance, the glass laminates can be formed as bent or shaped parts for use as windshields or cover plates. The structure of a shaped glass laminate may be simple or complex. In certain embodiments, a shaped glass laminate may have a complex curvature where the glass sheets have a distinct radius of curvature in two independent directions. Such shaped glass sheets may thus be characterized as having "cross curvature," where the glass is curved along an axis that is parallel to a given dimension and also curved along an axis that is perpendicular to the same dimension. An automobile sunroof, for example, typically measures about 0.5 m by 1.0 m and has a radius of curvature of 2 to 2.5 m along the minor axis, and a radius of curvature of 4 to 5 m along the major axis.

Shaped glass laminates according to certain embodiments can be defined by a bend factor, where the bend factor for a given part is equal to the radius of curvature along a given axis divided by the length of that axis. Thus, for the exemplary automotive sunroof having radii of curvature of 2 m and 4 m along respective axes of 0.5 m and 1.0 m, the bend factor along each axis is 4. Shaped glass laminates can have a bend factor ranging from 2 to 8 (e.g., 2, 3, 4, 5, 6, 7, or 8).

Figure 2:
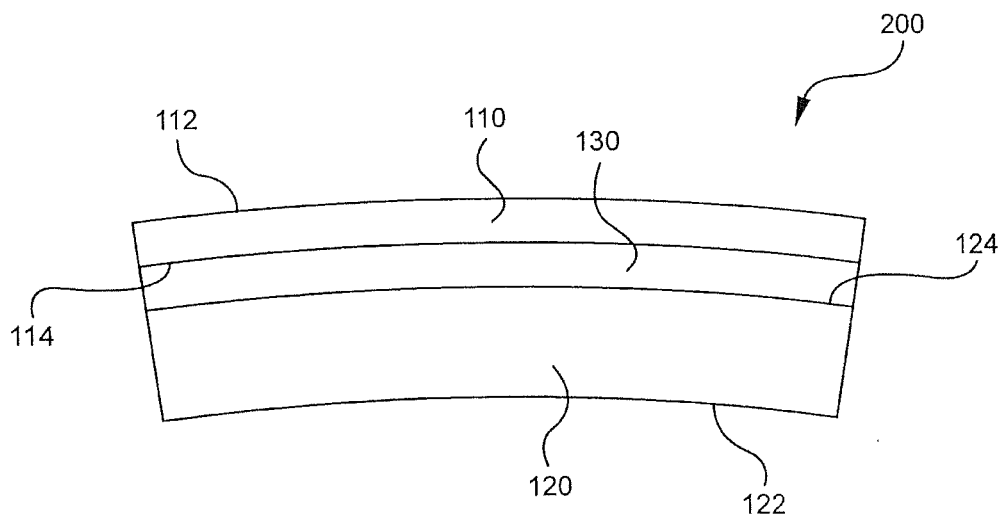
FIG. 2 is a schematic of an exemplary bent hybrid glass laminate according to other embodiments of the present disclosure.

An exemplary shaped glass laminate 200 is illustrated in FIG. 2. The shaped laminate 200 comprises an external (chemically-strengthened) glass sheet 110 formed at a convex surface of the laminate while an internal (non-chemically-strengthened) glass sheet 120 is formed on a concave surface of the laminate. It will be appreciated, however, that the convex surface of a non-illustrated embodiment can comprise a non-chemically-strengthened glass sheet while an opposing concave surface can comprise a chemically-strengthened glass sheet.

Figure 3:
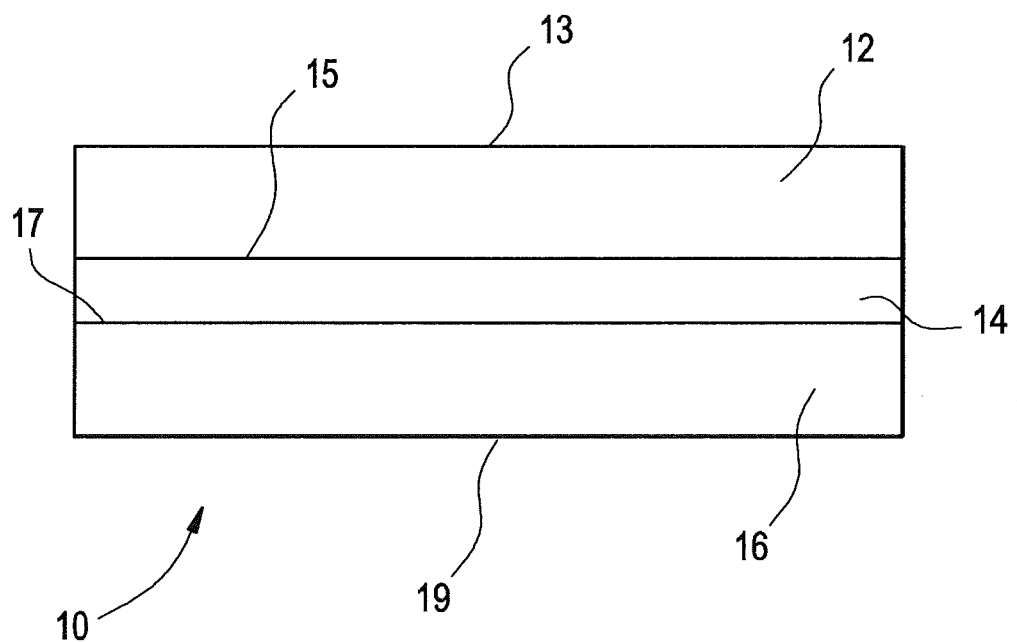
FIG. 3 is a schematic of an exemplary bent hybrid glass laminate according to further embodiments of the present disclosure.
Figure 4:
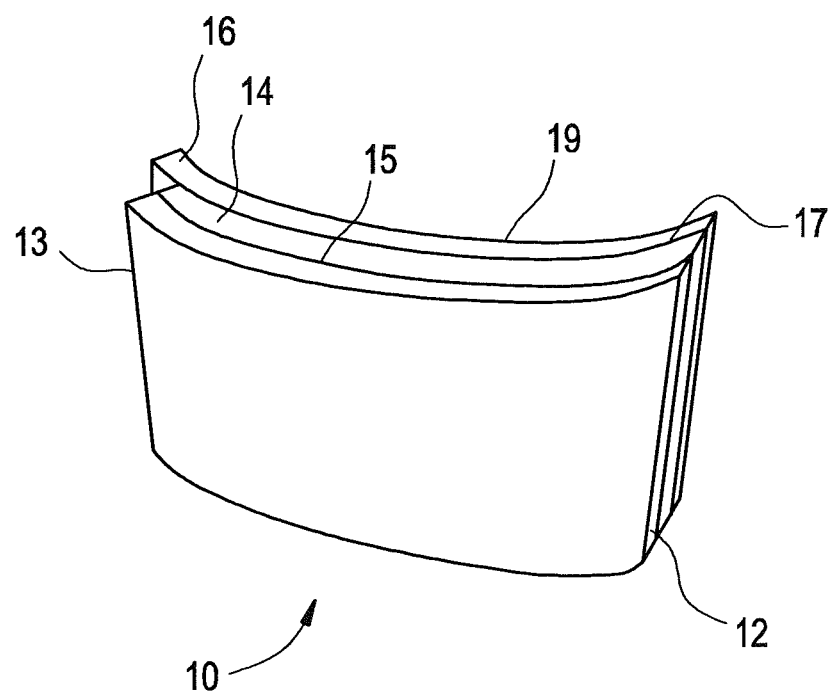
FIG. 4 is a schematic of an exemplary bent hybrid glass laminate according to additional embodiments of the present disclosure.

FIG. 3 is a cross sectional illustration of further embodiments of the present disclosure. FIG. 4 is a perspective view of additional embodiments of the present disclosure. With reference to FIGS. 3 and 4 and as discussed in previous paragraphs, an exemplary laminate structure 10 can include an inner layer 16 of chemically strengthened glass, e.g., Gorilla® Glass. This inner layer 16 may have been heat treated, ion exchanged and/or annealed. The outer layer 12 may be a non-chemically strengthened glass sheet such as conventional soda lime glass, annealed glass, or the like. The laminate 10 can also include a polymeric interlayer 14 intermediate the outer and inner glass layers. The inner layer of glass 16 can have a thickness of less than or equal to 1.0 mm and having a residual surface CS level of between about 250 MPa to about 350 MPa with a DOL of greater than 60 microns. In another embodiment the CS level of the inner layer 16 is preferably about 300 MPa. In one embodiment, an interlayer 14 can have a thickness of approximately 0.8 mm. Exemplary interlayers 14 can include, but are not limited to, poly-vinyl-butyral or other suitable polymeric materials as described herein. In additional embodiments, any of the surfaces of the outer and/or inner layers 12, 16 can be acid etched to improve durability to external impact events. For example, in one embodiment, a first surface 13 of the outer layer 12 can be acid etched and/or another surface 17 of the inner layer can be acid etched. In another embodiment, a first surface 15 of the outer layer can be acid etched and/or another surface 19 of the inner layer can be acid etched. Such embodiments can thus provide a laminate construction substantially lighter than conventional laminate structures and which conforms to regulatory impact requirements. Exemplary thicknesses of the outer and/or inner layers 12, 16 can range in thicknesses from 0.5 mm to 1.5 mm to 2.0 mm or more.

In a preferred embodiment, the thin chemically strengthened inner layer 16 may have a surface stress between about 250 MPa and 900 MPa and can range in thickness from 0.5 to 1.0 mm. In this embodiment, the external layer 12 can be annealed (non-chemically strengthened) glass with a thickness from about 1.5 mm to about 3.0 mm or more. Of course, the thicknesses of the outer and inner layers 12, 16 can be different in a respective laminate structure 10. Another preferred embodiment of an exemplary laminate structure may include an inner layer of 0.7 mm chemically strengthened glass, a poly-vinyl butyral layer of about 0.76 mm in thickness and a 2.1 mm exterior layer of annealed glass.

Exemplary glass layers can be made by fusion drawing, as generally described above and described in U.S. Pat. Nos. 7,666,511, 4,483,700 and 5,674,790, the entirety of each being incorporated herein by reference, and then chemically strengthening such drawn glass. Exemplary chemically strengthened glass layers can thus possess a deep DOL of CS and can present a high flexural strength, scratch resistance and impact resistance. Exemplary embodiments can also include acid etched or flared surfaces to increase the impact resistance and increasing the strength of such surfaces by reducing the size and severity of flaws on these surfaces. If etched immediately prior to lamination, the strengthening benefit of etching or flaring can be maintained on surfaces bonded to the inter-layer.

One embodiment of the present disclosure provides an exemplary glass laminate structure having a non-chemically strengthened external glass sheet, a chemically strengthened internal glass sheet, and at least one polymer interlayer intermediate the external and internal glass sheets. The polymer interlayer can be a single polymer sheet, a multilayer polymer sheet, or a composite polymer sheet. Further, the polymer interlayer can comprise a material such as, but not limited to, PVB, polycarbonate, acoustic PVB, ethylene vinyl acetate (EVA), thermoplastic polyurethane (TPU), ionomer, a thermoplastic material, and combinations thereof. The internal glass sheet can have a thickness ranging from about 0.5 mm to about 1.5 mm, and the external glass sheet can have a thickness ranging from about 1.5 mm to about 3.0 mm. In other embodiments, the internal glass sheet can have a thickness of between about 0.5 mm to about 0.7 mm, the polymer interlayer can have a thickness of between about 0.4 to about 1.2 mm, and/or the external glass sheet can have a thickness of about 2.1 mm. In another embodiment, the internal glass sheet can include one or more alkaline earth oxides, such that a content of alkaline earth oxides is at least about 5 wt. %. The internal glass sheet can also include at least about 6 wt. % aluminum oxide. In an additional embodiment, the external glass sheet comprises a material such as, but not limited to, soda-lime glass and annealed glass. Exemplary laminates can have an area greater than 1 m$^2$ and can be employed as an automotive windshield, sunroof or cover plate. In further embodiments, the inner glass layer can have a surface compressive stress between about 250 MPa and about 900 MPa or in another embodiment, a surface compressive stress of between about 250 MPa and about 350 MPa and a DOL of compressive stress greater than about 20 μm. Some embodiments, can acid etch any number or portion of the surfaces of the glass sheets.

Another embodiment of the present disclosure provides a glass laminate structure having a non-chemically strengthened external glass sheet, a chemically strengthened internal glass sheet, and at least one polymer interlayer intermediate the external and internal glass sheets where the inner glass layer has a surface compressive stress between about 250 MPa and about 900 MPa. In an additional embodiment, the inner glass layer can have a surface compressive stress of between about 250 MPa and about 350 MPa and a DOL of compressive stress greater than about 20 μm. Exemplary thicknesses of the internal glass sheet can range from about 0.5 mm to about 1.5 mm, and the external glass sheet can have thicknesses ranging from about 1.5 mm to about 3.0 mm. An exemplary polymer interlayer can be comprised of a material such as, but not limited to, PVB, polycarbonate, acoustic PVB, EVA, TPU, ionomer, a thermoplastic material, and combinations thereof and/or can have a thickness of between about 0.4 to about 1.2 mm.

Embodiments of the present disclosure may thus offer a means to reduce the weight of automotive glazing by using thinner glass materials while maintaining optical and safety requirements. Conventional laminated windshields may account for 62% of a vehicle's total glazing weight; however, by employing a 0.7-mm thick chemically strengthened inner layer with a 2.1-mm thick non-chemically strengthened outer layer, for example, windshield weight can be reduced by 33%. Furthermore, it has been discovered that use of a 1.6-mm thick non-chemically strengthened outer layer with the 0.7-mm thick chemically strengthened inner layer results in an overall 45% weight savings. Thus, use of exemplary laminate structures according to embodiments of the present disclosure may allow a laminated windshield to pass all regulatory safety requirements including resistance to penetration from internal and external objects and appropriate flexure resulting in acceptable Head Impact Criteria (HIC) values. In addition, an exemplary external layer comprised of annealed glass may offer acceptable break patterns caused by external object impacts and allow for continued operational visibility through the windshield when a chip or crack occurs as a result of the impact. Research has also demonstrated that employing chemically strengthened glass as an interior surface of an asymmetrical windshield provides an added benefit of reduced laceration potential compared to that caused by occupant impact with conventional annealed windshields.

Methods for bending and/or shaping glass laminates can include gravity bending, press bending and methods that are hybrids thereof. In a traditional method of gravity bending thin, flat sheets of glass into curved shapes such as automobile windshields, cold, pre-cut single or multiple glass sheets are placed onto the rigid, pre-shaped, peripheral support surface of a bending fixture. The bending fixture may be made using a metal or a refractory material. In an exemplary method, an articulating bending fixture may be used. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass.

A related technique is press bending where a single flat glass sheet is heated to a temperature corresponding substantially to the softening point of the glass. The heated sheet is then pressed or shaped to a desired curvature between male and female mold members having complementary shaping surfaces. The mold member shaping surfaces may include vacuum or air jets for engaging with the glass sheets. In embodiments, the shaping surfaces may be configured to contact substantially the entire corresponding glass surface. Alternatively, one or both of the opposing shaping surfaces may contact the respective glass surface over a discrete area or at discrete contact points. For example, a female mold surface may be ring-shaped surface. In embodiments, a combination of gravity bending and press bending techniques can be used.

A total thickness of the glass laminate can range from about 2 mm to 5 mm, with the external and/or internal chemically-strengthened glass sheets having a thickness of 1 mm or less (e.g., from 0.5 to 1 mm such as, for example, 0.5, 0.6, 0.7, 0.8, 0.9 or 1 mm). Further, the internal and/or external non-chemically-strengthened glass sheets can have a thickness of 2.5 mm or less (e.g., from 1 to 2 mm such as, for example, 1, 1.5, 2 or 2.5 mm) or may have a thickness of 2.5 mm or more. In embodiments, the total thickness of the glass sheets in the glass laminate is less than 3.5 mm (e.g., less than 3.5, 3, 2.5 or 2.3 mm).

Exemplary glass laminate structures are illustrated in Table 2, where the abbreviation GG refers to a chemically-strengthened aluminosilicate glass sheet, the term "glass" refers to a non-chemically-strengthened soda lime (SL) glass sheet, and PVB refers to poly(vinyl butyral), which may optionally be an acoustic grade PVB (A-PVB).

TABLE 2

Exemplary glass laminate structures

| | Configuration | | |
|---|---|---|---|
| Sample | Internal sheet | Interlayer | External sheet |
| 1 | 1.5 mm SL glass | 0.76-0.81 mm PVB | 0.7 mm GG |
| 2 | 1.5 mm SL glass | 0.76-0.81 mm PVB | 1.0 mm GG |
| 3 | 1.5 mm SL glass | 0.38-0.4 mm PVB | 0.7 mm GG |

TABLE 2-continued

Exemplary glass laminate structures

| | Configuration | | |
|---|---|---|---|
| Sample | Internal sheet | Interlayer | External sheet |
| 4 | 1.5 mm SL glass | 0.38-0.4 mm PVB | 1.0 mm GG |
| 5 | 1.6 mm SL glass | 0.76 mm PVB | 0.7 mm GG |
| 6 | 1.6 mm SL glass | 0.81 mm PVB | 0.7 mm GG |
| 7 | 1.6 mm SL glass | 1.14 mm PVB | 0.7 mm GG |
| 8 | 1.6 mm SL glass | 1.19 mm PVB | 0.7 mm GG |
| 9 | 1.6 mm SL glass | 0.38 mm PVB | 0.5 mm GG |
| 10 | 1.6 mm SL glass | 0.7 mm PVB | 0.5 mm GG |
| 11 | 2.1 mm SL glass | 0.76 mm PVB | 0.7 mm GG |
| 12 | 2.1 mm SL glass | 0.81 mm PVB | 1.0 mm GG |
| A | 1.0 mm GG | 0.76-0.81 mm PVB | 1.0 mm GG |
| B | 1.5 mm SL glass | 0.76-0.81 mm PVB | 1.5 mm SL glass |

Applicants have shown that the glass laminate structures disclosed herein have excellent durability, impact resistance, toughness, and scratch resistance. As is well known among skilled artisans, the strength and mechanical impact performance of a glass sheet or laminate is limited by defects in the glass, including both surface and internal defects. When a glass laminate is impacted, the impact point is put into compression, while a ring or "hoop" around the impact point, as well as the opposite face of the impacted sheet, are put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable.

Due to chemical strengthening, one or both of the surfaces of the chemically-strengthened glass sheets used in the disclosed hybrid glass laminates are under compression. The incorporation of a compressive stress in a near surface region of the glass can inhibit crack propagation and failure of the glass sheet. In order for flaws to propagate and failure to occur, the tensile stress from an impact must exceed the surface compressive stress at the tip of the flaw. In embodiments, the high compressive stress and high depth of layer of chemically-strengthened glass sheets enable the use of thinner glass than in the case of non-chemically-strengthened glass.

In the case of hybrid glass laminates, the laminate structure can deflect without breaking in response to the mechanical impact much further than thicker monolithic, non-chemically-strengthened glass or thicker, non-chemically-strengthened glass laminates. This added deflection enables more energy transfer to the laminate interlayer, which can reduce the energy that reaches the opposite side of the glass. Consequently, the hybrid glass laminates disclosed herein can withstand higher impact energies than monolithic, non-chemically-strengthened glass or non-chemically-strengthened glass laminates of similar thickness.

In addition to their mechanical properties, as will be appreciated by a skilled artisan, laminated structures can be used to dampen acoustic waves. The hybrid glass laminates disclosed herein can dramatically reduce acoustic transmission while using thinner (and lighter) structures that also possess the requisite mechanical properties for many glazing applications.

The acoustic performance of laminates and glazings is commonly impacted by the flexural vibrations of the glazing structure. Without wishing to be bound by theory, human acoustic response peaks typically between 500 Hz and 5000 Hz, corresponding to wavelengths of about 0.1-1 m in air and 1-10 m in glass. For a glazing structure less than 0.01 m (<10 mm) thick, transmission occurs mainly through coupling of vibrations and acoustic waves to the flexural vibration of the glazing. Laminated glazing structures can be designed to convert energy from the glazing flexural modes into shear strains within the polymer interlayer. In glass laminates employing thinner glass sheets, the greater compliance of the thinner glass permits a greater vibrational amplitude, which in turn can impart greater shear strain on the interlayer. The low shear resistance of most viscoelastic polymer interlayer materials means that the interlayer will promote damping via the high shear strain that will be converted into heat under the influence of molecular chain sliding and relaxation.

In addition to the glass laminate thickness, the nature of the glass sheets that comprise the laminates may also influence the sound attenuating properties. For instance, as between chemically-strengthened and non-chemically-strengthened glass sheets, there may be small but significant difference at the glass-polymer interlayer interface that contributes to higher shear strain in the polymer layer. Also, in addition to their obvious compositional differences, aluminosilicate glasses and soda lime glasses have different physical and mechanical properties, including modulus, Poisson's ratio, density, etc., which may result in a different acoustic response.

EXAMPLES

Conventional uniaxial strength tests, such as three- or four-point bending tests have been used to measure the strength of glass and ceramic materials. However, because the measured strength depends on edge effects as well as on the bulk material, the interpretation of uniaxial strength test results can be challenging.

Biaxial flexure tests, on the other hand, can be used to provide a strength assessment independent of edge-induced phenomena. In a biaxial flexure test, a glass laminate is supported at three or more points near its periphery and equidistant from its center and the laminate is then loaded at a central position. The location of maximum tensile stress thus occurs at the center of the laminate surface and, advantageously, is independent of the edge conditions.

Exemplary planar hybrid glass laminates were subjected to a standardized biaxial flexure test (ECE R43 headform as detailed in Annex 7/3). As explained further below, when an inventive glass laminate (sample 1) was impacted on the non-chemically-strengthened (soda-lime) side, both glass sheets fractured. However, when the sample 1 glass laminate was impacted on the chemically-strengthened side, the non-chemically-strengthened glass sheet fractured but the chemically-strengthened glass sheet remained intact in 50% of the samples tested.

In one test, a high loading rate impact is directed against the internal (non-chemically-strengthened) glass sheet 120. In response, both the interior surface 124 of the internal glass sheet 120 and the exterior surface 112 of the external glass sheet 110 are placed in tension. With the magnitude of the tensile stress on the exterior surface 112 being greater than the tensile stress at the interior surface 124, in this configuration the more moderate tensile stress on the interior surface 124 is sufficient to fracture the non-chemically-strengthened glass sheet 120, while the elevated tensile stress on the exterior surface 112 is sufficient to fracture the chemically-strengthened glass sheet 110 as well. As the glass sheets fracture, the PVB interlayer deforms but keeps the headform impact device from penetrating through the glass laminate. This is a satisfactory response under the ECE R43 headform requirement.

In a related test, the impact is directed instead against the external (chemically-strengthened) glass sheet 110. In response, the interior surface 114 of the external glass sheet 110 experiences a moderate tensile stress and exterior surface 122 of internal glass sheet 120 experiences a higher magnitude stress. In this configuration, the elevated stress on the exterior surface 122 of the internal, non-chemically-strengthened glass sheet 120 causes the non-chemically-strengthened glass sheet to fracture. However, the moderate tensile stress on the interior surface 114 of the external glass sheet 110 may not be sufficient to overcome the ion-exchanged induced compressive stress in near-surface region of the chemically-strengthened glass. In laboratory experiments, high loading rate impact resulted in breakage of the chemically-strengthened glass sheet 110 in only two of six samples tested. In the remaining four samples, the non-chemically-strengthened glass sheet 120 fractured but the chemically-strengthened glass sheet 110 remained intact. All of the inventive samples exceeded the impact requirements for non-windscreen glass as set forth by the ECE R43 headform requirement.

Comparative samples A and B were also subjected to the biaxial flexure test. Comparative sample A, which comprises a 1 mm chemically-strengthened glass sheet/0.76 mm standard PVB/1 mm chemically-strengthened glass sheet symmetric architecture, exhibited no breakage and thus failed the ECE R43 requirement that the glass laminate must break.

Comparison sample B comprises a 1.5 mm soda-lime glass sheet/0.76 mm standard PVB/1.5 mm soda-lime glass sheet symmetric architecture. Both glass sheets fractured as a result of the biaxial flexure test and thus comparison sample B passed the ECE R43 standard (Annex 7/3). However, both glass sheets in the comparison sample B glass laminate fractured regardless of which sheet was impacted, and thus failed to provide the robust mechanical resistance against external impact realized in the hybrid laminates. It was also noted during the testing that the recoil (i.e., bounce) of the headform was larger for comparison sample B than for sample 1, suggesting that the comparative architecture did not dissipate energy as effectively as the inventive example.

The head injury criterion (HIC) is a conventional metric that can be used to evaluate the safety of glass laminates. The HIC value is a dimensionless quantity, which can be correlated to a probability of sustaining an injury as a result of an impact. For internal impact events, a lower HIC value is desirable.

For exemplary planar hybrid glass laminates, the mean HIC value for impact on the non-chemically-strengthened side of a 1.6 mm SL/0.8 mm A-PVB/0.7 mm GG stack was 175, while the mean HIC value for impact on the chemically-strengthened side of a 0.7 mm GG/0.8 mm A-PVB/1.6 mm SL stack was 381. For automotive glazing applications, the mean HIC value for impact on the chemically-strengthened (exterior) side is advantageously greater than the mean HIC value for impact on the non-chemically-strengthened side. For example, the chemically-strengthened side HIC value can be greater than or equal to 400 (e.g., greater than or equal to 400, 450 or 500) and the non-chemically-strengthened side HIC value can be less than or equal to 400 (e.g., less than or equal to 400, 350, 300, 250, 200, 150 or 100) such that the chemically-strengthened side HIC value is at least 50 (e.g., at least 50, 100, 150 or 200) greater than the non-chemically-strengthened side value.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various light-weight hybrid glass laminates have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:
1. An automotive laminate comprising:
an interior surface;
a non-chemically strengthened external glass sheet;
a chemically strengthened internal glass sheet; and
at least one polymer interlayer intermediate the external and internal glass sheets and comprising any one or more of polyvinyl butyral (PVB), polycarbonate, acoustic PVB, ethylene vinyl acetate (EVA), thermoplastic polyurethane (TPU), and ionomer,
wherein the internal glass sheet has a thickness of 1.0 mm or less, wherein the external glass sheet has a thickness ranging from about 1.5 mm to about 3.0 mm, wherein the internal glass sheet comprises an alkali aluminosilicate glass, wherein the internal glass sheet includes one or more alkaline earth metal oxides, such that a content of alkaline earth metal oxides is at least 5 wt. %, and wherein a surface of the internal glass sheet constitutes the interior surface of the automotive laminate.

2. The automotive laminate of claim 1, wherein the internal glass sheet includes at least about 6 wt. % aluminum oxide.

3. The automotive laminate of claim 1, wherein the internal glass sheet has a thickness of less than about 0.7 mm.

4. The automotive laminate of claim 1, wherein the polymer interlayer comprises a single polymer sheet, a multilayer polymer sheet, or a composite polymer sheet.

5. The automotive laminate of claim 1, wherein the polymer interlayer has a thickness of between about 0.4 to about 1.2 mm.

6. The automotive laminate of claim 1, wherein the external glass sheet is a soda lime glass or an annealed glass.

7. The automotive laminate of claim 1, wherein the external glass sheet has a thickness of about 2.1 mm.

8. The automotive laminate of claim 1, wherein the glass laminate has an area greater than 1 m$^2$.

9. The automotive laminate of claim 1, wherein the laminate is an automotive windshield, sunroof or cover plate.

10. The automotive laminate of claim 1, wherein the internal glass layer has a surface compressive stress between about 250 MPa and about 900 MPa.

11. The automotive laminate of claim 1, wherein the internal glass layer has a surface compressive stress of between about 250 MPa and about 350 MPa and a DOL of compressive stress greater than about 20 µm.

12. The automotive laminate of claim 1 wherein a surface of the external glass sheet adjacent the interlayer is acid etched.

13. The automotive laminate of claim 1 wherein a surface of the internal glass sheet opposite the interlayer is acid etched.

14. An automotive laminate comprising:
an interior surface;
a non-chemically strengthened external glass sheet;
a chemically strengthened internal glass sheet; and
at least one polymer interlayer intermediate the external and internal glass sheets, wherein the internal glass sheet comprises an alkali aluminosilicate glass and has a surface compressive stress between about 250 MPa and about 900 MPa, wherein the internal glass sheet includes one or more alkaline earth metal oxides, such that a content of alkaline earth metal oxides is at least 5 wt. %, wherein the external glass sheet comprises soda lime glass, and wherein the interior surface consists of a surface of the internal glass sheet.

15. The automotive laminate of claim 14, wherein the internal glass sheet has a surface compressive stress of between about 250 MPa and about 350 MPa and a DOL of compressive stress greater than about 20 µm.

16. The automotive laminate of claim 14, wherein the internal glass sheet has a thickness ranging from about 0.5 mm to about 1.5 mm, and wherein the external glass sheet has a thickness ranging from about 1.5 mm to about 3.0 mm.

17. The automotive laminate of claim 14, wherein the polymer interlayer comprises a material selected from the group consisting of polyvinyl butyral (PVB), polycarbonate, acoustic PVB, ethylene vinyl acetate (EVA), thermoplastic polyurethane (TPU), ionomer, a thermoplastic material, and combinations thereof.

18. The automotive laminate of claim 14, wherein the polymer interlayer has a thickness of between about 0.4 to about 1.2 mm.

19. An automotive laminate comprising:
an interior surface;
a non-chemically strengthened external glass sheet comprising a soda lime glass;
a chemically strengthened internal glass sheet comprising an alkali aluminosilicate glass and a surface compressive stress between about 250 MPa and about 900 MPa; and
at least one polymer interlayer intermediate the external and internal glass sheets and comprising any one or more of polyvinyl butyral (PVB), polycarbonate, acoustic PVB, ethylene vinyl acetate (EVA), thermoplastic polyurethane (TPU), and ionomer, wherein the internal glass sheet has a thickness of 1 mm or less, wherein the external glass sheet has a thickness ranging from about 1.5 mm to about 3.0 mm, wherein a surface of the internal glass sheet constitutes the interior surface of the automotive laminate, wherein the internal glass sheet includes one or more alkaline earth metal oxides, such that a content of alkaline earth metal oxides is at least 5 wt. %.

* * * * *